United States Patent [19]

Houska

[11] 4,049,475
[45] Sept. 20, 1977

[54] SECo$_5$-PERMANENT MAGNET JOINED TO AT LEAST ONE IRON MASS AND METHOD OF FABRICATING SUCH A PERMANENT MAGNET

[75] Inventor: Jaroslaw Houska, Niederrohrdorf, Switzerland

[73] Assignee: BBC Brown Boveri & Company, Limited, Baden, Switzerland

[21] Appl. No.: 685,260

[22] Filed: May 11, 1976

[30] Foreign Application Priority Data

May 22, 1975 Switzerland .................. 6571/75

[51] Int. Cl.$^2$ ............................................. H01F 1/02
[52] U.S. Cl. ................................. 148/101; 148/31.57; 148/103; 428/671
[58] Field of Search ............... 148/101, 103, 31.57; 29/194, 196.3, 196.6, 199, 602 R, 607, 608–609; 264/DIG. 58

[56] References Cited

U.S. PATENT DOCUMENTS

| | | | |
|---|---|---|---|
| 3,031,330 | 4/1962 | Hornick | 29/196.6 |
| 3,682,716 | 8/1972 | Martin et al. | 148/101 |
| 3,720,503 | 3/1973 | Trost | 29/196.6 |
| 3,858,308 | 1/1975 | Peterson | 29/608 |

FOREIGN PATENT DOCUMENTS 1,430,357  3/1976  United Kingdom ............. 148/103

OTHER PUBLICATIONS

Young, J. F.; *Materials and Processes*, London, 1954, pp. 822–825.

*Primary Examiner*—Walter R. Satterfield
*Attorney, Agent, or Firm*—Oblon, Fisher, Spivak, McClelland & Maier

[57] ABSTRACT

An SECo$_5$-permanent magnet composite of said permanent magnet bonded to at least one piece of iron wherein there is provided between said permanent magnet and the iron piece a metallic layer which is hard-soldered to both the permanent magnet and the iron piece, and wherein SE is an element having an atomic number of 58–71 or mixtures thereof.

5 Claims, 1 Drawing Figure

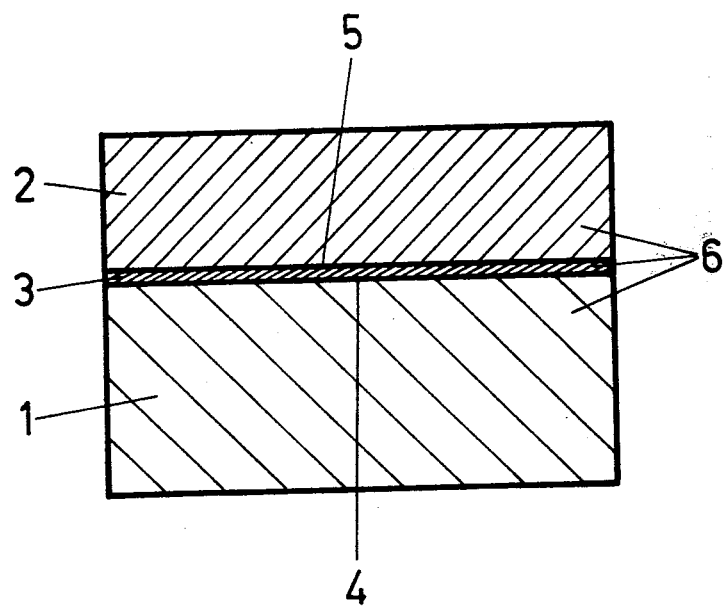

SECo$_5$-PERMANENT MAGNET JOINED TO AT LEAST ONE IRON MASS AND METHOD OF FABRICATING SUCH A PERMANENT MAGNET

BACKGROUND OF THE INVENTION

1. Field of the Invention

The present invention relates to an SECo$_5$ permanent magnet joined to at least one iron mass and a method of fabricating such a permanent magnet.

2. Description of the Prior Art

SECo$_5$-permanent magnets, wherein SE denotes at least one of the elements in the atomic number range 58–71 of the Periodic Table have become very important in the manufacture of motors, magnetic bearings and clutches as well as in the construction of traveling-wave tubes because of their exceptionally high coercive force and remanence. In all these applications, the permanent magnets must be joined to iron alloys. In DT-PS No. 852,585, for example, a permanent magnet with a soft-iron layer sintered onto it is disclosed. However, such a device can only be made at temperatures above those which SECo$_5$-permanent magnets can endure. Attempts by the applicant to join the SECo$_5$ permanent magnet to an iron mass by soft-soldering did not prove successful since the chemically active fluxes used in soft-soldering react with the magnet material and greatly reduce both the strength of the bond and the magnetic properties of the permanent magnet after soldering. Cementing of the permanent magnet to the iron mass was also tried by the applicant, but is not particularly advantageous, since a part fabricated in this manner can be heated at most to only 100°–200° C without harmful effects on its mechanical strength. Soldered SECo$_5$-permanent magnets with high mechanical strength are disclosed in DT-OS No. 2,340,018, but they are made by a method applicable exclusively to joining similar magnetic materials.

SUMMARY OF THE INVENTION

Accordingly, it is one object of this invention to provide an SECo$_5$-permanent magnet joined to an iron mass and a method for making the same, which magnet retains its mechanical and magnetic properties even at temperatures above 100° C and which is, moreover, simple and economical to produce.

This and other objects of this invention as will be hereinafter made clear have been attained by providing between the permanent magnet and the iron mass a metallic layer which is hard-soldered to them both. The method of this invention comprises providing each of the parts to be joined with at least one solderable surface, covering these solderable surfaces with at least one intermediate layer, clamping the combination of permanent magnet, intermediate layer and iron, and soldering this combination under a protective atmosphere at temperatures above 600° C.

An SECo$_5$-permanent magnet joined in this manner to an iron mass not only retains its magnetic characteristics, but also is so strongly bonded to the iron at the soldered areas that under high mechanical stress even at temperatures above 200° C. it is not the solder bond but the brittle permanent magnet material that fails. Moreover, no corrosive residue is left at the soldered places, and the thin oxide films on the soldered surfaces are incorporated directly in the solder bond without harmful results.

BRIEF DESCRIPTION OF THE DRAWINGS

A more complete appreciation of the invention and many of the attendant advantages thereof will be readily attained as the same becomes better understood by reference to the following detailed description when considered in connection with the accompanying drawings, wherein:

The FIGURE is a cross section of a SmCo$_5$-permanent magnet soldered to a block of soft iron.

DETAILED DESCRIPTION OF THE PREFERRED EMBODIMENTS

To produce the finished workpiece, soldering surfaces 4 and 5 are first ground on both the Sm-Co$_5$-alloy permanent magnet produced, for example, in a powder-metallurgy sintering process, and also the soft-iron block 2, such as the pole piece of an electrical machine, with a polishing wheel, for instance. The surfaces are preferably then cleaned with an organic solvent such as acetone or ethanol. Thereafter, the permanent magnet 1 and soft iron piece 2 are pressed together with a solder foil 3 for example made of silver or copper, interposed at the soldering surfaces 4 and 5. Typically, such foils are approximately 50 μm thick. The combination is clamped in a holder, not shown, such as that disclosed in DT-OS No. 2,340,018. The work piece 6 and holder are then placed in the cool region of a sintering oven which has a conventional gas atmosphere such as one of the inert gases, e.g., He, Ne, Ar, Kr or Xe. The annealing region of the area should be heated to a temperature somewhat about the melting point of the solder foil used, i.e., to about 1085° C for copper and about 965° C for silver. By introducing the work piece into the annealing region, the soldering process, which usually takes about 10 minutes, is started. Depending on the temperature setting, the size of the work piece and the nature of the solder-foil material, however, the soldering time can vary considerably.

At the end of the soldering process, the work piece 6 is rapidly cooled in the cool zone of the sintering oven. Subsequent heat treatment of the work piece 6 for two to three hours at temperatures between 850° and 950° C is particularly advantageous, since the magnetic characteristics of the permanent magnet are thereby greatly improved.

The strength of the soldered work piece is so great that under mechanical loading, such as bending or shearing stresses, even at temperatures above 200° C, the brittle permanent-magnet material, and not the solder bond, fails. This result is due not only to the known alloy formation in the contact region between the solder foil 3 and the permanent magnet 1, as already disclosed in DT-OS No. 2,340,018, but also in particular to the formation of an iron-copper or iron-silver alloy in the contact region between the solder foil 3 and the soft-iron piece 2. While the porous permanent magnet 1 forms an alloy even at temperatures below the melting point of the solder foil 3, alloying of the soft iron 2 with the solder foil 3 begins only at the melting point of the latter. After cooling of the work piece, a strong bonding layer is formed, the thickness of which, however, should not be above 50 μm. It has been established in a number of trials that solder foils 3 of thickness not exceeding 50 μm produce work piece with the best mechanical and magnetic properties.

In a further refinement of the invention, the solder layer 3 is galvanically deposited on the soldering surface 5 of the soft-iron piece. Here too, the solder layer should not be thicker than 50 μm. The soldering of the work piece can then be performed in the same way as with the solder foil described above. That is, the temperature should be just above the melting point of the solder layer, i.e., at 1085° C for copper. In the case of permanent magnets which can not withstand such high temperatures, it is also possible, however, to achieve a strong solder bond at a lower soldering temperature. For example, with a copper solder foil, even a temperature of 1040° C is sufficient for producing a mechanically high-quality work piece. The reason is that on the one hand, alloy formation between the copper of the solder material and the metal of the permanent magnet, such as CeMM has already begun at this temperature, and on the other hand, the copper of the solder layer is already so intimately bonded to the soft iron piece when galvanically deposited on the soldering surface, that soldering takes place even before the melting point of the copper is reached.

The invention is not limited to just $SmCo_5$ or CeMM-$Co_5$-magnets. It extends also to other $SECo_5$-alloy-containing permanent magnets, wherein SE stands for one or more of the elements with atomic numbers between 58 and 71. Moreover, the iron piece 2 can be replaced by iron-containing alloys instead of soft iron, but care must naturally be taken that it have the same coefficient of thermal expansion as the permanent magnet. As the solder layer copper and silver can be used alone or as components in alloys containing these elements and/or alloyed with gold, nickel or tin. Particularly recommended alloys are:

| Alloy (%) | Temperature Range (° C) |
|---|---|
| Cu Au (70/30) | 980 – 1140 |
| Cu Au Ni (62/35/3) | 1020 – 1140 |
| Cu Au (62.5/37.5) | 990 – 1140 |
| Cu Ag (95/5) | 1050 – 1140 |
| Au Ni (82/18) | 950 – 1140 |
| Cu Sn Ag (85/8/7) | 950 – 1140 |
| Cu Au Ag (55/42/3) | 960 – 1140 |
| Au Cu Ag (58/40/2) | 910 – 1140 |
| Cu Ag (60/40) | 910 – 1140 |
| Au Cu Ag (75/20/5) | 890 – 1140 |
| Au Cu (81.5/18.5) | 884 – 1140 |
| Pt Sn (70/30) | 1072 – 1140 |
| Ni FeP (56/33/11) | 1020 – 1140 |
| Ti Ni (70/30) | 955 – 1140 |
| Cu Si (97/3) | 1025 – 1140 |
| Cu Mg (85/15) | 960 – 1140 |
| Ni P (89/11) | 880 – 1140 |
| Cu Ti (76/24) | 900 – 1140 |
| Cu Zn (60/40) | 900 – 1140 |
| Cu Zn Sn (59/39/2) | 900 – 1140 |
| Cu Zn (42/58) | 845 – 1140 |
| Cu Zn (54/46) | 890 – 1140 |
| Ag Cu Zn (5/55/40) | 860 – 1140 |
| Ag Cu Zn (12/48/40) | 830 – 1140 |
| Ag Cu Cd Zn (12/50/5/33) | 800 – 1140 |
| Ag Cu Zn (20/44/36) | 810 – 1140 | or mixtures thereof, wherein the numbers in parenthesis refer to the proportions by weight of the mixture alloy components and the temperature ranges are those most suitable for soldering of each alloy.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. An $SECo_5$-permanent magnet composite of said permanent magnet bonded to at least one piece of iron wherein there is provided between said permanent magnet and the iron piece a metallic intermediate layer comprising Cu, Ag, Au or alloys thereof, or an alloy selected from the group consisting of: Cu Au (70/30), Cu Au Ni (62/35/3), Cu Au (62.5/37.5), Cu Ag (95/5), Au Ni (82/18), Cu Sn Ag (85/8/7), Cu Au Ag (55/42/3), Au Cu Ag (58/40/2), Cu Ag (60/40), Au Cu Ag (75/20/5), Au Cu (81.5/18.5), Pt Sn (70/30), Ni FeP (56/33/11), Ti Ni (70/30), Cu Si (97/3), Cu Mg (85/15), Ni P (89/11), Cu Ti (76/24), Cu Zn (60/40), Cu Zn Sn (59/39/2), Cu Zn (42/58), Cu Zn (54/46), Ag Cu Zn (5/55/40), Ag Cu Zn (12/48/40), Ag Cu Zn (12/50/5/33), Ag Cu Zn (20/44/36) or mixtures thereof, wherein the numbers in parenthesis refer to the proportions by weight of the respective alloy components and having a thickness equal to or less than 50 μm which is hard-soldered to both the permanent magnet and the iron piece, and wherein SE is an element having an atomic number of 58–71 or mixtures thereof.

2. The $SECo_5$-permanent magnet composite of claim 1, wherein said permanent magnet is a powder-metallurgically sintered permanent magnet containing $SmCo_5$, $CeMMCo_5$ or mixtures thereof and the iron piece consists of soft iron.

3. A method of producing an $SeCo_5$-permanent magent bonded to an iron substrate which comprises:
   a. providing said iron substrate and said permanent magnet with at least one solderable surface by grinding and subsequently cleaning said surface with an organic solvent;
   b. covering said solderable surface with at least one solderable, intermediate foil layer having a thickness of 50 μ or less wherein said intermediate foil layer contains Cu, Ag, Ni, Sn or mixtures thereof;
   c. clamping said permanent magnet, intermediate layer and said iron substrate together to form a work piece combination;
   d. soldering said work piece under a protective atmosphere at a temperature of above 600° C, and
   e. rapidly cooling the soldered work piece.

4. The method of claim 3, wherein said intermediate layer contains Cu, Ag, Au, Ni, Sn or mixtures thereof and said work piece is soldered between 850° and 1100° C, which further comprises rapidly cooling the soldered work piece and thereafter heat treating it between 850 and 950° C for up to three hours.

5. The method of claim 4, wherein when a copper intermediate layer is used, the work piece is soldered at about 1085° C and when silver is used, at about 965° C

* * * * *